United States Patent
Alas, Jr.

(10) Patent No.: US 10,130,087 B1
(45) Date of Patent: Nov. 20, 2018

(54) CHUM DISPENSER

(71) Applicant: Victor Manuel Alas, Jr., Apopka, FL (US)

(72) Inventor: Victor Manuel Alas, Jr., Apopka, FL (US)

(*) Notice: Subject to any disclaimer, the term of this patent is extended or adjusted under 35 U.S.C. 154(b) by 305 days.

(21) Appl. No.: 14/927,660

(22) Filed: Oct. 30, 2015

(51) Int. Cl.
*A01K 97/02* (2006.01)
*B63B 35/14* (2006.01)
*B63B 17/00* (2006.01)

(52) U.S. Cl.
CPC .............. *A01K 97/02* (2013.01); *B63B 17/00* (2013.01); *B63B 35/14* (2013.01)

(58) Field of Classification Search
CPC .......... A01K 97/02; B63B 17/00; B63B 35/14
USPC ..... 43/44.99, 56; 119/245, 259; 210/167.21, 210/167.25, 167.26, 167.27; 114/255, 114/364
See application file for complete search history.

(56) References Cited

U.S. PATENT DOCUMENTS

| | | | | |
|---|---|---|---|---|
| 695,921 A * | 3/1902 | Forster | .................... | A01K 97/02 119/51.04 |
| 742,414 A * | 10/1903 | Hale | ....................... | A01K 61/80 119/51.04 |
| 742,415 A * | 10/1903 | Hale | ..................... | A01K 61/025 119/51.04 |
| 848,101 A * | 3/1907 | Hale | ..................... | A01K 61/025 119/51.04 |
| 2,243,896 A * | 6/1941 | Cupples | .................. | A01K 61/80 222/80 |
| 2,582,015 A * | 1/1952 | Duncan, Jr. | ............ | A01K 75/00 114/255 |
| 2,709,869 A * | 6/1955 | Larson | ................... | A01K 97/02 43/44.99 |
| 3,249,257 A * | 5/1966 | Nolt | ....................... | A01K 97/02 221/205 |
| 3,459,247 A * | 8/1969 | Goodman | ........... | B02C 18/0092 241/38 |
| 4,275,522 A * | 6/1981 | Glover | ................... | A01K 97/05 137/579 |

(Continued)

FOREIGN PATENT DOCUMENTS

| | | | | |
|---|---|---|---|---|
| EP | | 923863 A1 * | 6/1999 | ............. A01K 97/02 |
| FR | | 2705529 A1 * | 12/1994 | ............. A01K 97/02 |

(Continued)

*Primary Examiner* — Darren W Ark
(74) *Attorney, Agent, or Firm* — Hanrahan Law Firm, P.A.; Benjamin M. Hanrahan

(57) ABSTRACT

A chum dispenser for selectively and controllably dispensing chum into a surrounding body of water is provided. Specifically, the chum dispenser includes at least one receptacle with an interior portion, defining at least two sections separated by a porous divider. The two sections include an upper chum receiving section and a lower chum dispensing section. An inlet line is fluidically connected to the chum receiving section and a fluid/water source. The inlet line is structured to provide a flow of fluid/water into the chum receiving section for mixing with the chum and creating a fluid-chum mixture. An outlet line is disposed in a fluidically communicative relation with the chum dispensing section of the receptacle in order to provide a flow of the fluid-chum mixture into the surrounding body of water. A fluid control assembly provides a selective control of the fluid-chum mixture from the chum dispensing section.

15 Claims, 11 Drawing Sheets

(56) References Cited

U.S. PATENT DOCUMENTS

| | | | |
|---|---|---|---|
| 4,959,921 A | 10/1990 | Stanish et al. | |
| 4,970,982 A * | 11/1990 | Martin | B63B 35/14 114/255 |
| 4,977,854 A | 12/1990 | Marrs | |
| 4,997,559 A * | 3/1991 | Ellis | A01K 63/047 210/167.27 |
| 5,096,576 A * | 3/1992 | Szabo | A01K 63/045 119/260 |
| 5,165,198 A * | 11/1992 | Kilian, III | A01K 97/05 383/100 |
| 5,316,670 A * | 5/1994 | Yao | A01K 63/045 119/259 |
| 5,390,439 A * | 2/1995 | Kilian, III | A01K 63/006 43/55 |
| 5,397,463 A * | 3/1995 | Woltmann | A01K 63/045 119/260 |
| 5,409,603 A * | 4/1995 | Tsung | A01K 63/045 119/259 |
| 5,453,182 A * | 9/1995 | Kikuta | A01K 63/045 119/259 |
| 5,474,673 A * | 12/1995 | Ludlow | A01K 63/045 119/260 |
| 5,632,220 A * | 5/1997 | Vento | A01K 63/042 114/255 |
| 5,662,306 A * | 9/1997 | Dysarz | F16M 13/02 248/514 |
| 5,720,124 A | 2/1998 | Wentzell et al. | |
| 5,728,293 A * | 3/1998 | Guoli | A01K 63/045 210/151 |
| 5,842,303 A * | 12/1998 | Abraham | A01K 97/02 119/51.04 |
| 6,012,368 A * | 1/2000 | Gicesku | A01K 97/02 83/147 |
| 6,101,759 A * | 8/2000 | Power | A01K 97/05 261/121.2 |
| 6,363,652 B1 * | 4/2002 | Spinelli | A01K 97/02 119/51.04 |
| 6,442,887 B2 | 9/2002 | Sanquist | |
| 6,581,322 B1 * | 6/2003 | Spinelli | A01K 97/02 43/44.99 |
| 7,152,363 B1 * | 12/2006 | Garcia-Cruz | A01K 97/02 43/44.99 |
| 7,172,692 B1 * | 2/2007 | Liao | A01K 63/045 210/130 |
| 7,181,883 B1 * | 2/2007 | Nassef | A01K 97/02 43/44.99 |
| 7,225,583 B1 | 6/2007 | Stacy et al. | |
| 7,249,435 B1 | 7/2007 | Tetenes | |
| 7,252,762 B2 * | 8/2007 | Carley | A01K 63/045 119/259 |
| 7,316,775 B2 * | 1/2008 | Carley | A01K 63/045 119/259 |
| 7,445,706 B2 * | 11/2008 | Liu | A01K 63/04 210/167.21 |
| 7,488,417 B2 * | 2/2009 | Chauquet | A01K 63/045 119/260 |
| 7,603,960 B1 * | 10/2009 | Perry | B63B 21/04 114/364 |
| 7,611,130 B2 * | 11/2009 | Sylvester | A01K 63/042 119/201 |
| 7,927,483 B2 * | 4/2011 | Huehn | A01K 63/045 119/259 |
| 7,931,801 B2 * | 4/2011 | Wang | A01K 63/045 119/259 |
| 8,002,245 B2 * | 8/2011 | Sylvester | A01K 63/042 119/201 |
| 8,171,884 B2 | 5/2012 | Dornburg et al. | |
| 8,216,477 B2 * | 7/2012 | Weidl | A01K 63/04 210/136 |
| 8,453,605 B2 * | 6/2013 | Tominaga | A01K 63/045 119/259 |
| 8,667,729 B2 | 3/2014 | Coffield | |
| 8,757,459 B2 * | 6/2014 | Crawford | B63B 17/00 114/364 |
| 9,043,997 B2 * | 6/2015 | Agresta | A01K 63/045 |
| 9,788,533 B2 * | 10/2017 | Allen | A01K 63/045 |
| 2002/0189989 A1 * | 12/2002 | Cheng | A01K 63/045 210/167.21 |
| 2003/0205512 A1 * | 11/2003 | Chen | A01K 63/045 210/167.22 |
| 2004/0061008 A1 * | 4/2004 | Hauler | A01K 97/02 241/101.2 |
| 2005/0258086 A1 * | 11/2005 | Lin | A01K 63/045 210/167.27 |
| 2006/0180534 A1 * | 8/2006 | Fox | A01K 63/045 210/167.22 |
| 2006/0273037 A1 * | 12/2006 | Venezia | A01K 63/045 210/703 |
| 2007/0068063 A1 | 3/2007 | Simpson | |
| 2009/0120860 A1 * | 5/2009 | Tsai | A01K 63/045 210/167.26 |
| 2010/0012559 A1 * | 1/2010 | Arita | A01K 63/006 210/120 |
| 2010/0139148 A1 | 6/2010 | Barker | |
| 2012/0085019 A1 | 4/2012 | Link | |
| 2014/0224179 A1 | 8/2014 | Mignone | |

FOREIGN PATENT DOCUMENTS

| | | | | |
|---|---|---|---|---|
| FR | 2789852 A1 | * | 8/2000 | A01K 97/02 |
| FR | 2820281 A1 | * | 8/2002 | A01K 97/02 |
| GB | 2359473 A | * | 8/2001 | A01K 97/02 |
| GB | 2462463 A | * | 2/2010 | A01K 97/02 |
| JP | 05252854 A | * | 10/1993 | |
| JP | 07099870 A | * | 4/1995 | |
| JP | 2000316444 A | * | 11/2000 | |
| JP | 2000324996 A | * | 11/2000 | |
| JP | 2001120142 A | * | 5/2001 | |
| JP | 2001211797 A | * | 8/2001 | |
| WO | WO-0048459 A1 | * | 8/2000 | A01K 97/02 |

\* cited by examiner

CHUM DISPENSER

FIELD OF THE INVENTION

The present invention is generally directed to a chum dispenser removably attached to or at least partially integrally formed with a boat or watercraft to controllably dispense chum into a surrounding body of water.

BACKGROUND OF THE INVENTION

Fishing, or the practice of catching fish and other aquatic or marine life, is an ancient activity and can be performed recreationally, for sport or commercially. Oftentimes, in order to lure or bait the fish or other marine life, fishermen may use chumming tactics, which can include throwing or tossing chum overboard the boat and into the surrounding body of water. The chum can include whole or chopped up bait or other products, including fish, fish parts, scrap meat, flesh, bone, blood, etc. that can entice or lure marine life near the boat or watercraft. Chum can often be purchased, obtained or prepared prior to embarking on a fishing excursion, although sometimes chum can be prepared on site, during the fishing excursion, for example, using pre-purchased fish or fish that has been caught. Chum can oftentimes be purchased or packaged in a block, for example, a frozen block, which can either be chopped up and tossed into the surrounding water, or tossed into the surrounding water whole. Some devices, such as burlap or meshed bags may be used, which allow the fisherman to fill the bag(s) with the chum and hang or suspend the bag from the side of the boat and into the water.

One problem with these chumming techniques is that it is difficult to control the rate at which the chum is released into the water. For example, when a burlap or mesh bag is used to hold the chum, e.g., a frozen, thawed or fresh amount of chum, the water will rather quickly release the chum through the openings in the bag. If the chumming technique fails, or if the fisherman wants to lure more fish, another block of chum would have to be used.

Accordingly, there is a need in the art for a chum dispenser that can be used to receive an amount of chum, for example, a frozen, thawed or fresh block or amount of chum, and which can be used to selectively control the rate at which the chum is released into the surrounding body of water. The proposed chum dispenser would include a main receptacle defining an interior portion that can receive the chum or chum block. An inlet line will direct a flow of water into the interior portion to mix with the chum, and an outlet line will direct a flow of the chum-fluid mixture into the surrounding body of water. One or more fluid control assemblies, e.g., control valves, can be included on the inlet and/or outlet lines to control the rate at which the fluid flows into the receptacle and the rate at which the fluid-chum mixture flows out.

SUMMARY OF THE INVENTION

In particular, the present invention is directed to a chum dispenser that can be used to controllably or selectively release an amount of chum into the surrounding body of water in order to bait or lure fish or other marine life, typically for purposes of fishing, whether recreational, for sport, or commercial. Specifically, the chum dispenser of at least one embodiment may include an attachment assembly that is configured to removably attach to one or more portions of a boat or watercraft. For example, the attachment assembly may removably attach or mount to one or more boat cleats (e.g., a typical boat cleat may be used as a base in which a rope or other like structure can be tied to, oftentimes for purposes of docking). Other embodiments may attach or mount to a fishing rod retention channel, which can include an internal channel along the edge of a boat, or other location, that is typically used to receive the handle end of a fishing rod. Still, other embodiments of the chum dispenser of the present invention may be integrally formed or permanently built into the boat or watercraft, including, but not limited to, the hull, transom, and/or other part, portion or section of the watercraft.

Either way, the chum dispenser includes a receptacle defining an interior portion within which an amount of chum may be placed. An inlet pipe or line (e.g., PVC or other tubular piping) is disposed in a fluidically communicative relation with the interior portion and a water or fluid source. The water or fluid source may include the surrounding body of water in that one end of the inlet line may be submerged in the surrounding body of water (e.g., ocean or lake). A water or other pump may be disposed in-line with or connected to or communicative with the inlet line to draw water from the surrounding body of water and into the receptacle. Other embodiments may include use of an on-board source of water, or use of an on-board water pump in order to draw water from the water source and into the receptacle.

Furthermore, an outlet line is also fluidically connected to the receptacle for providing a flow of water/chum out of the receptacle and into the surrounding body of water to lure or bait the fish. Particularly, as the water or fluid enters the receptacle via the inlet line, the water or fluid will mix with the chum disposed therein and create a fluid-chum mixture. For example, in the case of a frozen block or frozen amount of chum, as the water or fluid enters the receptacle via the inlet line, the chum will begin to thaw and mix with the water or fluid. That fluid-chum mixture will then flow out of the outlet line and into the surrounding body of water. One or more fluid control assemblies, for example, control valves, may be disposed on or connected to the inlet line and/or the outlet line in order to control the flow of water into the receptacle and the flow of the fluid-chum mixture out of the receptacle.

In some embodiments, the interior portion of the receptacle is divided into two or more sections, for example, via a porous, pervious or other divider constructed with one or more holes, openings, etc. to allow the fluid-chum mixture (i.e., the water mixed with bits and pieces of the chum) to flow there through. The divider may thus be used to define a first or upper chum receiving section (e.g., positioned above or one side of the divider) and a second or lower chum dispensing section (e.g., positioned below or on the opposite side of the divider). The chum may be initially placed into the chum receiving section of the interior portion, e.g., on top of the divider. In this manner, the inlet line will be positioned to direct a flow of water or other fluid into the upper chum receiving section, and the outlet line will be positioned or communicative with the lower chum dispensing section. As the water or fluid flows into the upper chum receiving section, the water or fluid will mix with the chum and will flow through the porous divider into the lower chum dispensing section, where it can then be selectively or controllably dispensed using the outlet line.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
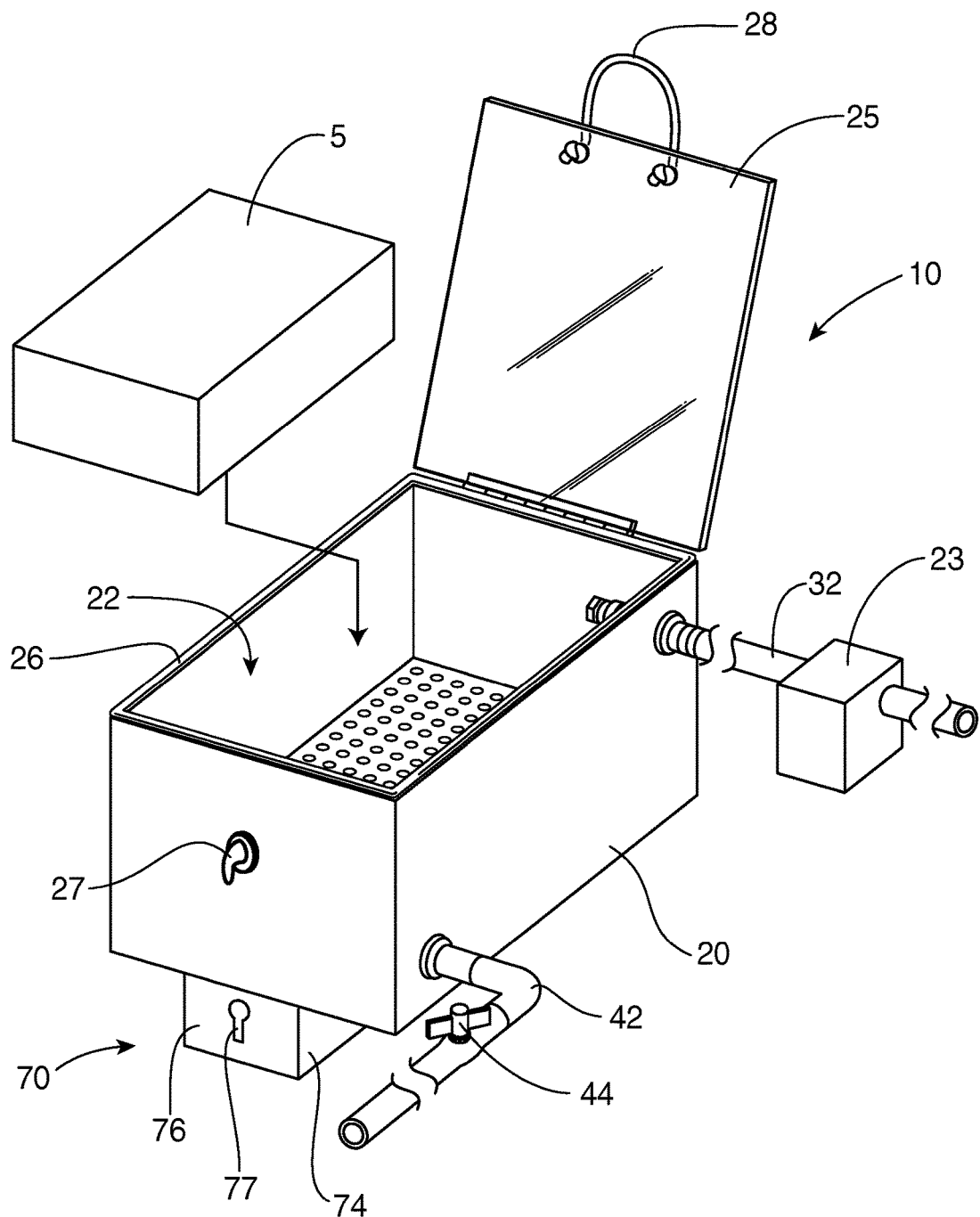
FIG. 1 is a partially exploded, partially cut-away view of the chum dispenser as disclosed in accordance with at least one embodiment of the present invention.

As shown in the accompanying drawings, and with particular reference to FIG. 1, for example, the present invention is directed to a chum dispenser, generally referenced as 10. Specifically, the chum dispenser 10 may be removably attached to, fixedly or permanently attached to or at least partially or substantially integrated with a portion of a boat 1, such as a boat hull 2, transom or other portion. Either way, the chum dispenser 10 is structured to receive chum 5, mix the chum 5 with a fluid, such as water, and controllably release or dispense the chum 5 or fluid-chum mixture 7 into surrounding water, for example, a lake, ocean, etc. In certain embodiments, the chum 5 may include one or more blocks, chunks or portions of frozen bait (including, but not limited to, parts of a fish or other marine life, such as the flesh, bone and/or blood) which is designed to attract fish. However, it should be noted that virtually any type or quantity of chum 5 may be used within the full spirit and scope of the present invention, whether frozen, thawed, fresh, live, ground, chopped, etc.

Particularly, with reference to FIG. 1, the chum dispenser 10 of at least one embodiment comprises a receptacle or main compartment 20 defining an at least partially open interior portion 22. In some embodiments, the receptacle 20 may be constructed of a durable and substantially rigid material including, but not limited to fiberglass, wood, plastic, metal, aluminum, etc. or any combination thereof. Furthermore, the receptacle 20, and in particular, the interior portion 22 thereof, may be sized and configured to receive a typical frozen block or brick of chum 5. In this manner, the receptacle 20 or interior portion 22 thereof may be rectangular and sized in a manner to accept or receive a frozen rectangular or other shaped block of chum 5. Other sizes, shapes and configurations are contemplated within the full spirit and scope of the present invention.

For example, the receptacle 20 may include one or more side walls, a bottom, and a lid 25 configured to selectively provide access into the interior portion 22. In the embodiment shown, the lid 25 is selectively disposed between an open (FIGS. 1 and 2A) and a closed (FIG. 2B) configuration via a hinge secured to one end. When closed, the lid 25 is structured to securely close off the interior portion 22, for example, by pivoting, sliding or otherwise closing an open top portion, as shown. Other embodiments may include a lid or opening on the side that provides selective access to the interior portion 22 of the main receptacle 20.

It should also be noted that in some embodiments, a gasket 26, for example, a rubber gasket or other resilient structure may be disposed along the upper edge of the side walls of the receptacle 20, such that, when the lid 25 is closed the lid 25 will be able to secure against the gasket 26 and provide a tight seal. This can help prevent the release of odors or even liquid or debris from the interior portion 22 of the receptacle 20, particularly when chum 5 or other like components are disposed therein, as described in accordance with the various embodiments of the present invention.

In addition, some embodiments may include a closure assembly or locking assembly that further facilitates or otherwise provides a secure and tight connection between the lid 25 and the base or body of the receptacle 20. For example, in the embodiments illustrated in FIG. 1, the closure assembly includes a hook 27 which may securely hold or retain a cooperatively structured and positioned retention device 28. Specifically, the retention device 28 may include a rope, cord, string, bungee or other flexible, and in some cases, at least partially stretchable, material or construction, secured to the lid 25. For instance, in the embodiment shown in FIG. 1, the retention device 28 may be disposed through the lid 25, e.g., through cooperatively sized holes, and knotted or otherwise secured in a manner such that the retention device 28 remains attached to the lid 25. Of course, other retention devices 28 are contemplated, and other manners in which to secure the retention device 28 to the lid are contemplated.

Furthermore, with the lid 25 disposed in a closed position, for example, covering the base or interior portion 22 of the receptacle 20, the retention device 28 may be manually positioned over and into the downwardly facing hook 27 in order to securely retain the lid 25 in the closed position, thereby sealing the interior portion to again prevent or restrict the release of odors or debris, for example, from the interior portion 22. It should be noted again that other closure assemblies are contemplated within the full spirit and scope of the present invention in order to securely retain the lid 25 onto the body or base of receptacle 20 in a closed manner.

Moreover, in some embodiments, the lid 25 may be at least partially, substantially or completely transparent or clear, allowing a user to view the contents of the interior portion 22 of the receptacle 20 while the lid 25 is closed. Accordingly, the lid 25 of some embodiments may be constructed of glass, plastic, plexiglass, etc. Other embodiments may include a viewing window on the lid 25 or on a portion of the receptacle 20 to allow viewing of the interior portion 22 of the receptacle 20. In this manner, a user may view the inside of the receptacle during operation in order to view the speed or rate in which the chum is being dispensed.

This allows the user to control the contents of the receptacle, if desired or if needed, for example, by increasing/decreasing the rate of water or fluid flow into or out of the receptacle and/or by adding/removing chum to/from the receptacle.

Figure 2A:
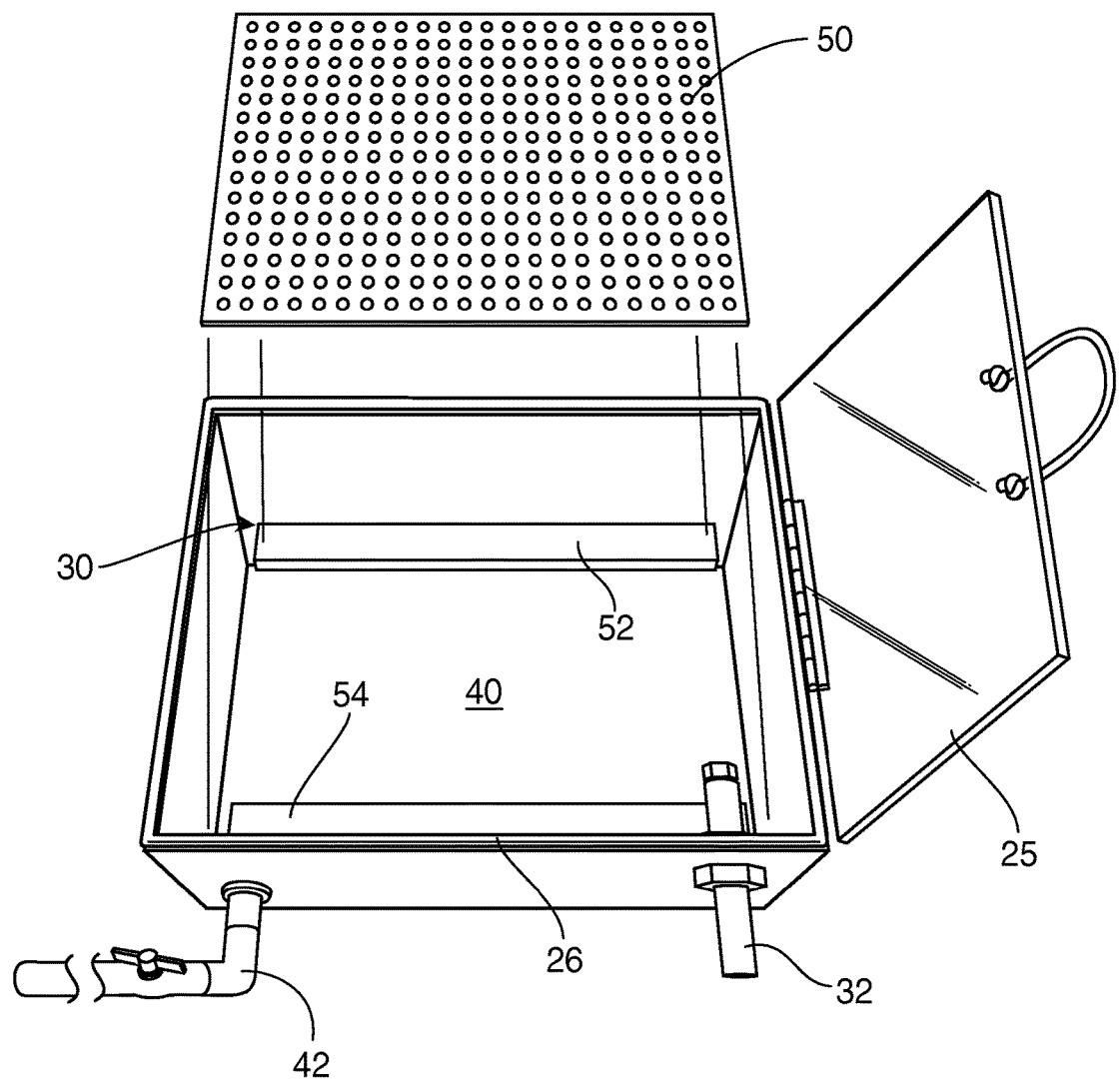
FIG. 2A is a partially exploded, partially cut-away top perspective view of the chum dispenser of FIG. 1.
Figure 2B:
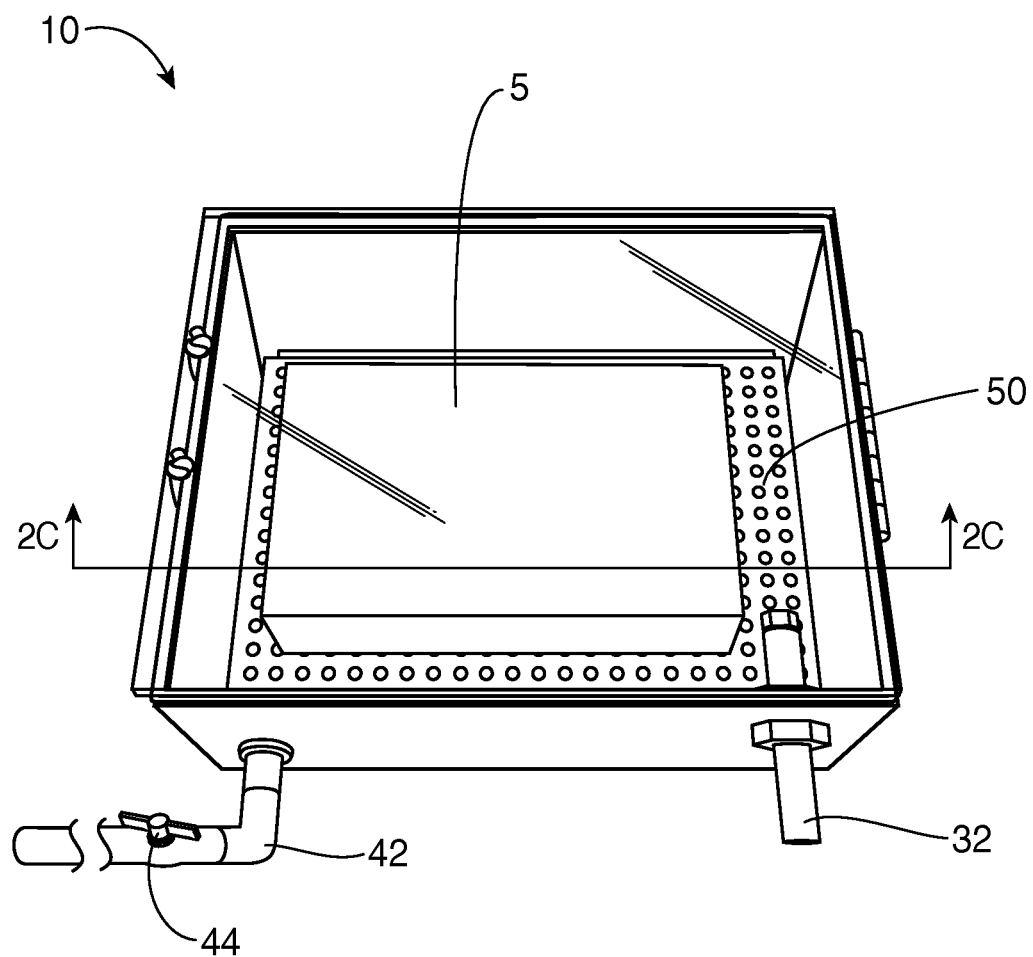
FIG. 2B is a partial cut-away top perspective view of the chum dispenser of FIG. 2A.
Figure 2C:
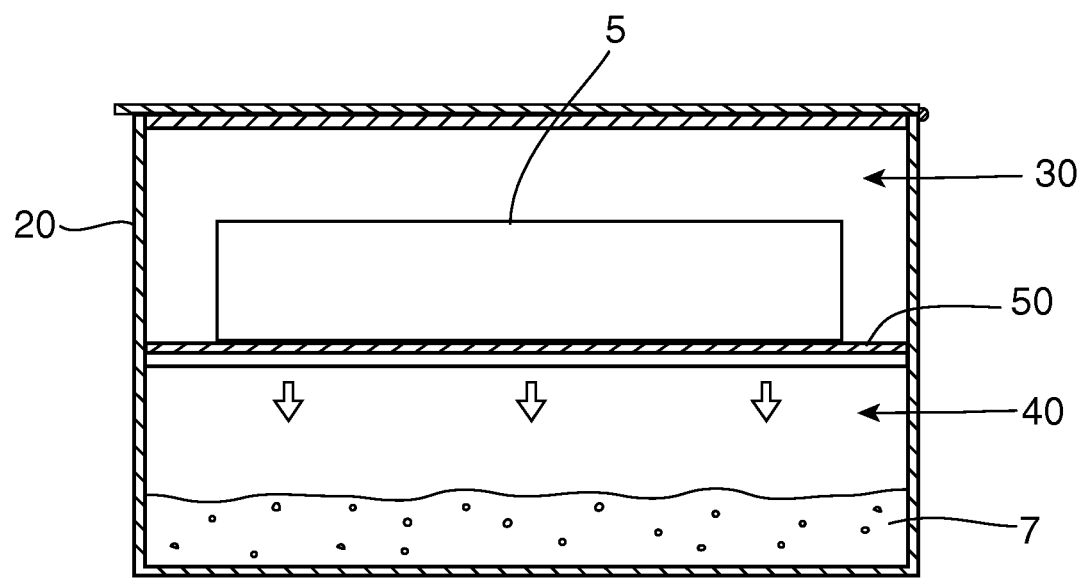
FIG. 2C is a sectional view along line 2C-2C of the chum dispenser illustrated in FIG. 2B.

Referring now to FIGS. 2A through 2C, the interior portion 22 of the receptacle 20 of at least one embodiment includes at least two sections or chambers 30, 40 at least partially separated by a divider 50. For instance, in one embodiment, as shown in FIGS. 2A through 2C, the two sections include an upper chum receiving section 30 and a lower chum dispensing section 40, divided or separated by the divider 50. For instance, the chum 5 (e.g., a frozen block or brick or chum) may be placed into the chum receiving section 30 and on top of the divider 50. As described herein, water or other fluid may flow into the chum receiving section 30 of the interior portion 22 of the receptacle 20, and as the chum 5 thaws or otherwise mixes with the water or other fluid, a fluid-chum mixture 7 is produced. The fluid-chum mixture 7 will flow through the divider 50 and into the chum dispensing section 40, as shown in FIG. 2C, for example. It should be noted, however, that in certain embodiments or implementations, the interior portion 22 need not necessarily include the two separate sections 30, 40 and a divider 50. Rather, the interior portion 22 may be a single chamber within which the chum is placed and mixed with water or other fluid which is then drained via an outlet line 42.

With reference to FIGS. 1, 2A and 2B, the chum dispenser 10 of at least one embodiment includes an inlet line 32 disposed in a fluidically communicative relation with the chum receiving section 30 in order to provide a flow of water or other fluid into the chum receiving section 30. The inlet line 32 may include one or a series of pipes, PVC pipes, metal pipes, or other substantially hollow tubes or structures for facilitating a flow of water or other fluid there through. More in particular, the inlet line 32 is fluidically connected or otherwise disposed at one end to a fluid or water source W, which provides the fluid or water through the inlet line 32 and into the chum receiving section 30 of the receptacle 20. The fluid or water source W may include a surrounding body of water, e.g., a lake, ocean, etc., or an on-board water source, for example. A water pump 23 may be used to draw water from the water source W and provide the flow of water or fluid into the receptacle 20. Moreover, the water pump 23 and/or water source W may be part of the boat or watercraft 1 construction, or may be part of the chum dispenser 10 of the present invention.

Other embodiments may allow the inlet line 32 to connect to a fresh or other water source, for example, via a hose or other structure provided by the boat or watercraft 1. It should be noted that virtually any water source or assembly W, including water or fluid pumps 23 or mechanisms may be contemplated within the full spirit and scope of the present invention in order to allow the water or fluid from the water source W to flow through the inlet line 32 and into the chum receiving section 30 of the receptacle 20. An inlet control valve (not shown) may be included in order to selectively control the flow of fluid into the receptacle 20. The control valve may be disposed at or near the receptacle 20, for example, along the inlet line 32, although, in other embodiments, the control of the flow of fluid may be provided via the water source W, water pump or other mechanisms structured and configured to facilitate the flow of water to the receptacle 20.

In any event, as described above, as the fluid or water mixes with the chum 5 disposed within the chum receiving section 30, a fluid-chum mixture 7 is created. Particularly, in the event the chum 5 includes a frozen block of chum, as the water or fluid contacts the frozen block, the chum 5 will slowly thaw and mix with the fluid.

As shown in FIGS. 2A and 2B, for example, the divider 50 of at least one embodiment includes an at least partially porous or pervious configuration in that it may include a plurality of holes, openings or apertures disposed there through. For example, the divider 50 may include a mesh panel, metal, plastic or aluminum grate, or a substantially planar sheet of material with a plurality of holes or openings such as grate holes disposed along or about a substantial area of its surface. The holes or openings in the divider 50 may vary from one implementation to another, although they should be large enough to allow passage of small pieces of the chum to fall through along with the water or fluid. In any event, in some embodiments, the size of the openings or holes in the divider 50 should not allow passage of chum pieces that are large enough to clog or block the outlet line 42, as described herein.

For instance, the chum dispenser 10 of at least one embodiment includes and outlet line 42 disposed in a fluidically communicative relation with the chum dispensing section 40 of the receptacle in order to provide a flow of the fluid-chum mixture 7 from the chum dispensing section 40 and into the surrounding body of water, such as a lake or ocean, for example. The outlet line 42 may include one or a series of pipes, PVC pipes, metal pipes, or other substantially hollow tubes or structures for facilitating a flow of water, chum, oil, fluid-chum mixture, or other fluid(s) there through. Particularly, as the chum dispensing section 40 begins to accumulate the fluid-chum mixture 7, the outlet line 42 provides a channel in which the fluid-chum mixture 7 can be dispensed from the chum dispensing section 40 and into the surrounding body of water. The mixture of the chum and the fluid (e.g., the fluid-chum mixture 7) can then be used to attract other fish and marine life for the purposes of fishing, viewing, entertainment, or other purposes.

An outlet fluid control assembly 44 may be interconnected to or part of the outlet line 42 in order to provide selective control of the rate of flow of the fluid-chum mixture 7 from the chum dispensing section 40. For example, the fluid control assembly 44 may include a valve (e.g., a ball or other type of valve) that can be used to open, close or restrict the flow of fluid or fluid-chum mixture 7 through the outlet line 42. Although a manual valve 44 is shown in the drawings, for example, in FIGS. 1, 2A and 2B, in which a user may manually turn a handle to at least partially open or close the valve 44, other embodiments may include other valves, whether manual, automatic or power driven. Automatic control valves, for example, valves set on a timer, or values with sensors to measure the flow of fluid there though may also be contemplated herein. Particularly, in the embodiment in which the receptacle 20 may be integrated within, built in, or provided as part of the boat 1 (e.g., the boat hull), the fluid control assembly 44 may be controlled electronically, for example, via a control panel disposed at or near the receptacle 20 or via a control panel disposed at or near the boat operation controls.

Moreover, in some embodiments, as illustrated in FIG. 2A, the divider 50 may be removably disposed within the receptacle 20, for example upon or within a support assembly. This allows the divider 50 and the interior portion 22 of the receptacle 20 to be easily cleaned or wiped down, for instance, when not in use. Particularly, as shown, in one embodiment, the interior portion 22 of the receptacle 20 may include one or more interior support ledges 52, 54 defining the support assembly upon which the divider 50 may be disposed. For example, the ledges 52, 54 may extend outwardly from an interior surface of one or more of the side walls, providing a supporting surface upon which the divider 50 may be placed. It should be noted, however, that other support assemblies structured to support the divider 50 within the interior portion 22 of the receptacle 20 are contemplated. For instance, the interior portion 22 of the receptacle 20 may include one or more slots (e.g., on the inside surface of one or more of the side walls) within which the divider 50 may be positioned. Other embodiments may include feet or legs extending from a bottom surface of the divider 50, which may rest on the bottom of the interior surface 22 of the receptacle 20, or one or more support surfaces extending from the bottom of the interior surface upon which the divider 50 may be positioned.

In any event, in certain embodiments, the divider 50 is structured to define the boundary between the chum receiving section 30 and the chum dispensing section 40. For instance, as illustrated, the chum receiving section 30 may be positioned above the chum dispensing section 40, with the divider 50 positioned between. In this manner, gravity, along with the flow of the water or fluid, causes the fluid-chum mixture 7 to pass through the divider 50, e.g., via the plurality of openings or holes therein, and into the chum dispensing section 40 where it can then be dispensed into the surrounding body of water through the outlet line 42.

Some embodiments may further include a manually-operated or electrically operated grinder (not shown) disposed within the interior portion of the receptacle 20, and in particular, within the chum receiving section 30. The grinder can include a plurality of blades that rotate within the receptacle 20 and contact the chum, thereby grinding the chum into smaller pieces. This can be used to grind whole fish, parts of fish, frozen or fresh fish, etc.

Figure 3:
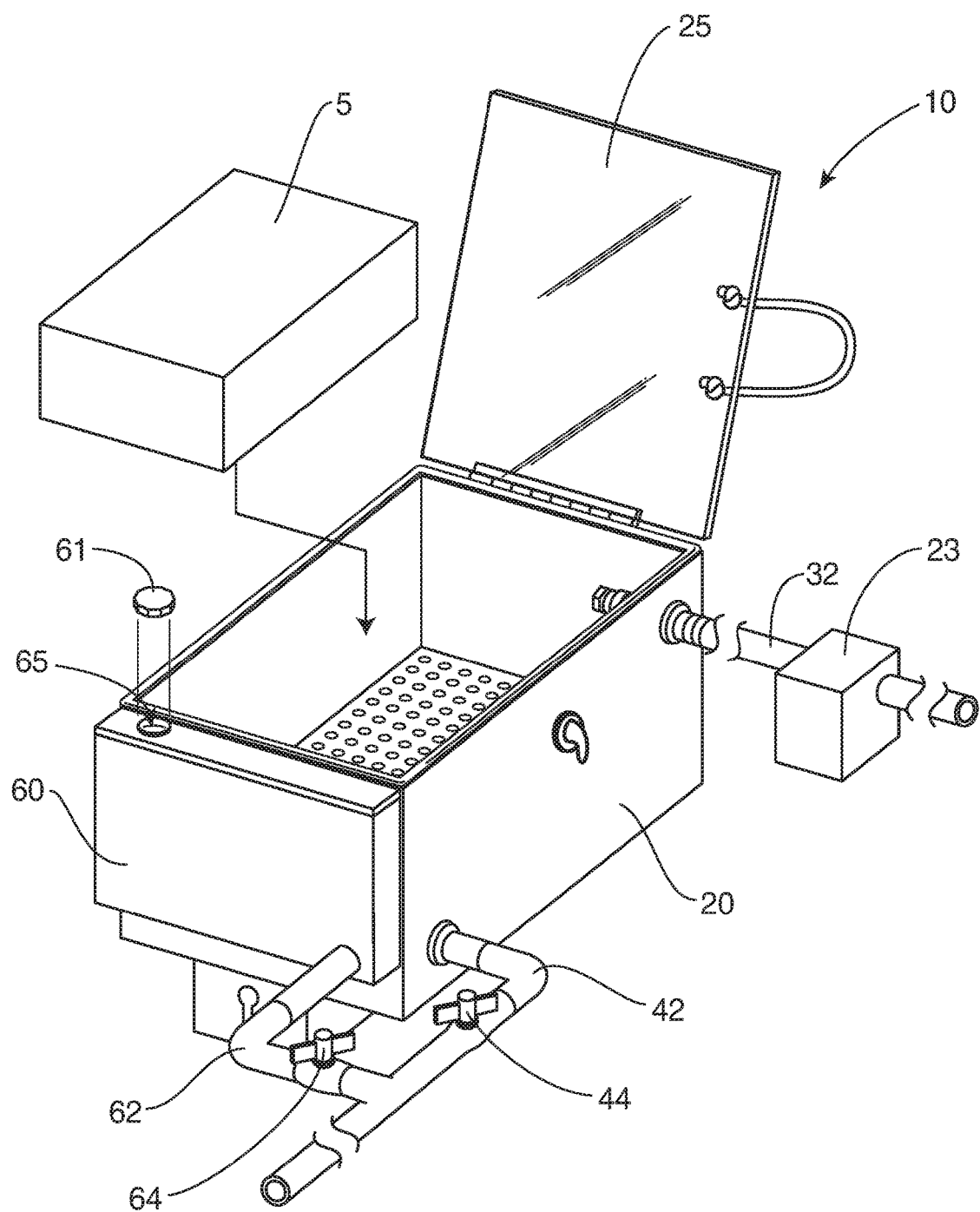
FIG. 3 is a partially exploded, partially cut-away front perspective view of another embodiment of the chum dispenser of at least one embodiment of the present invention.

Yet another embodiment of the chum dispenser 10 is illustrated in FIG. 3. Particularly, the chum dispenser 10 may include a secondary receptacle 60 including an opening 61 or lid and an outlet line, such as an intermediate outlet line 62. Specifically, the secondary receptacle 60 may function as an oil or liquid receptacle in that a user may place liquid-based or oil-based fish attractants, such as, but not limited to fish oil, therein. An opening, such as a cap 61 or lid, may be removably or movably disposed relative to the secondary receptacle 60 or otherwise disposed between an open and a closed orientation allowing the user to access the interior of the secondary receptacle 60. Particularly, with the lid 61 open or removed, fish oil or other liquid- or oil-based fish attractants may be poured or placed inside the secondary receptacle.

In some embodiments, the secondary receptacle 60 includes an interior portion 65 that is substantially isolated from the interior portion 22 of the main receptacle 20. For example, the contents that are contained within the secondary receptacle 60 will not mix with the contents of the interior portion 22 of the main receptacle 20, at least while the contents remain within the respective receptacles 60, 20. For example, as shown in FIG. 3, the secondary receptacle 60 of one embodiment may be secured or may be extending outward from an outside surface of the main receptacle 20, such that the interior portions 22, 65 of the two receptacles are not exposed to one another. Other locations of the secondary receptacle 60 are contemplated within the full spirit and scope of the present invention.

Moreover, an outlet line, such as an intermediate outlet line 62, may extend from the secondary receptacle 60, for example, proximate the bottom or lower portion of the receptacle, allowing for the oil or other like fish attractants to flow from the secondary receptacle 60 via gravity or via the natural flow of the liquid or oil. Although not shown in the drawings, the outlet line 62 extending from the secondary receptacle 60 may terminate directly into the surrounding water such that the outlet line 62 from the secondary receptacle 60 and the outlet line from the main receptacle 20 do not intersect or interconnect with one another.

However, in at least one embodiment, and as shown in FIG. 3, for example, the outlet line 62 may be an intermediate outlet line that interconnects with the outlet line 42 extending from the main receptacle 20. Particularly, in this embodiment, a user may decide to mix the oil or other liquid- or oil-based fish attractant disposed in the secondary receptacle 60 with the fluid-chum mixture 7 dispensed from the main receptacle 20. For example, because the intermediate outlet line 62 of one embodiment intersects with the outlet line 42 from the main receptacle 20, the fluids that are dispensed from the secondary receptacle 20 (e.g., fish oil) and the main receptacle 20 (e.g., fluid-chum mixture 7) may mix with one another prior to being dispensed into the surrounding body of water.

It should also be noted that the main receptacle 20 may be used to flush clean fluid (e.g., water without the chum) through the outlet line 42 and mix with the fish oil or other oil- or liquid-based attractant from the secondary receptacle 60 via the interconnection of the intermediate outlet line 62 and the main outlet line 42. In this manner, in operation, the main receptacle 20, and in particular, the chum receiving section 30 thereof, may be absent of any chum, allowing the fluid or water to flow through the receptacle 20 and out of the outlet line 42 without being mixed with chum. As the oil from the secondary receptacle 42 flows through the intermediate outlet line 62, it will mix with the water or fluid coming though the main outlet line 42 before being dispensed into the surrounding body of water. This may help with the flow of the oil or other like product though the outlet line(s) 42, 62 and into the surrounding water.

A secondary fluid control assembly 64 may also be included as part of or interconnected to the intermediate outlet line 62 in order to selectively or automatically control the flow of the oil or other like fish attractant from the secondary receptacle 60 in a manner similar to the various embodiments of the fluid control assembly 44 described herein.

Figure 4A:
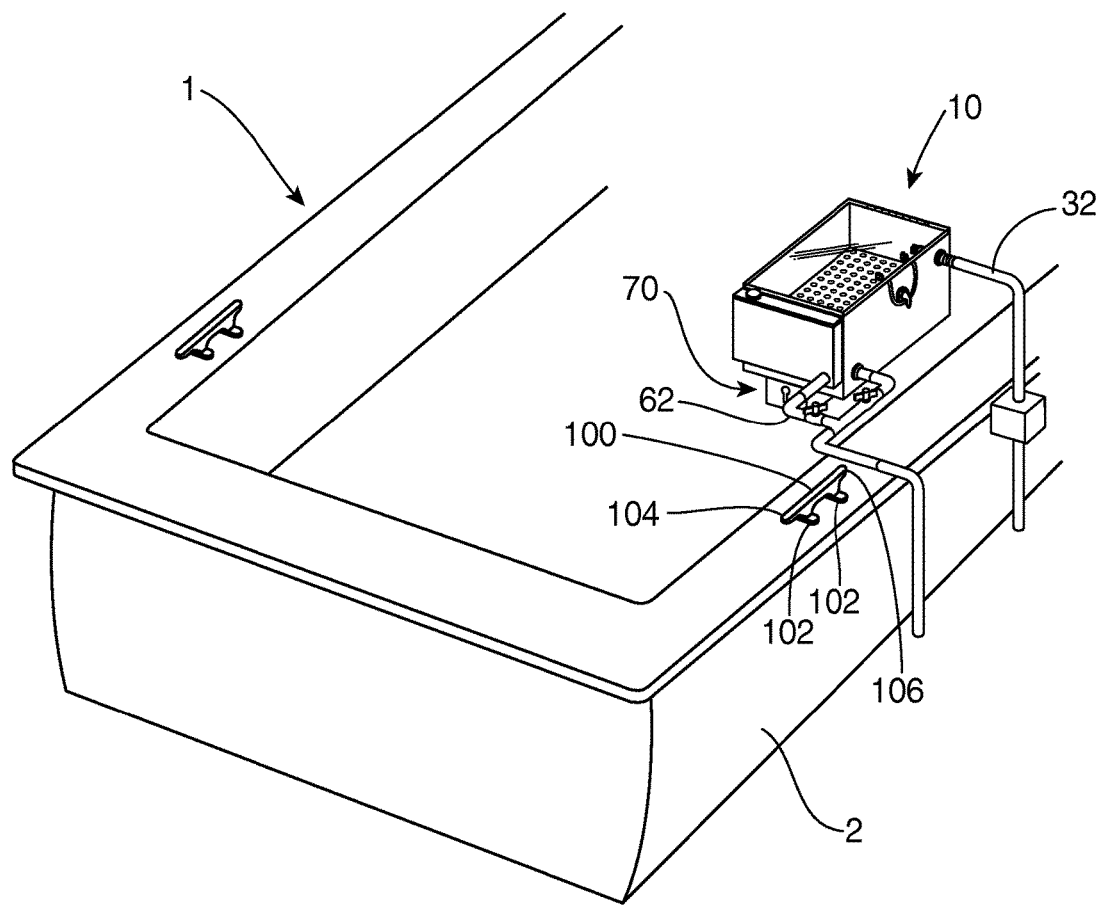
FIG. 4A is a partially exploded and cut away view of the chum dispenser of at least one embodiment attachable to a boat cleat.
Figure 4B:
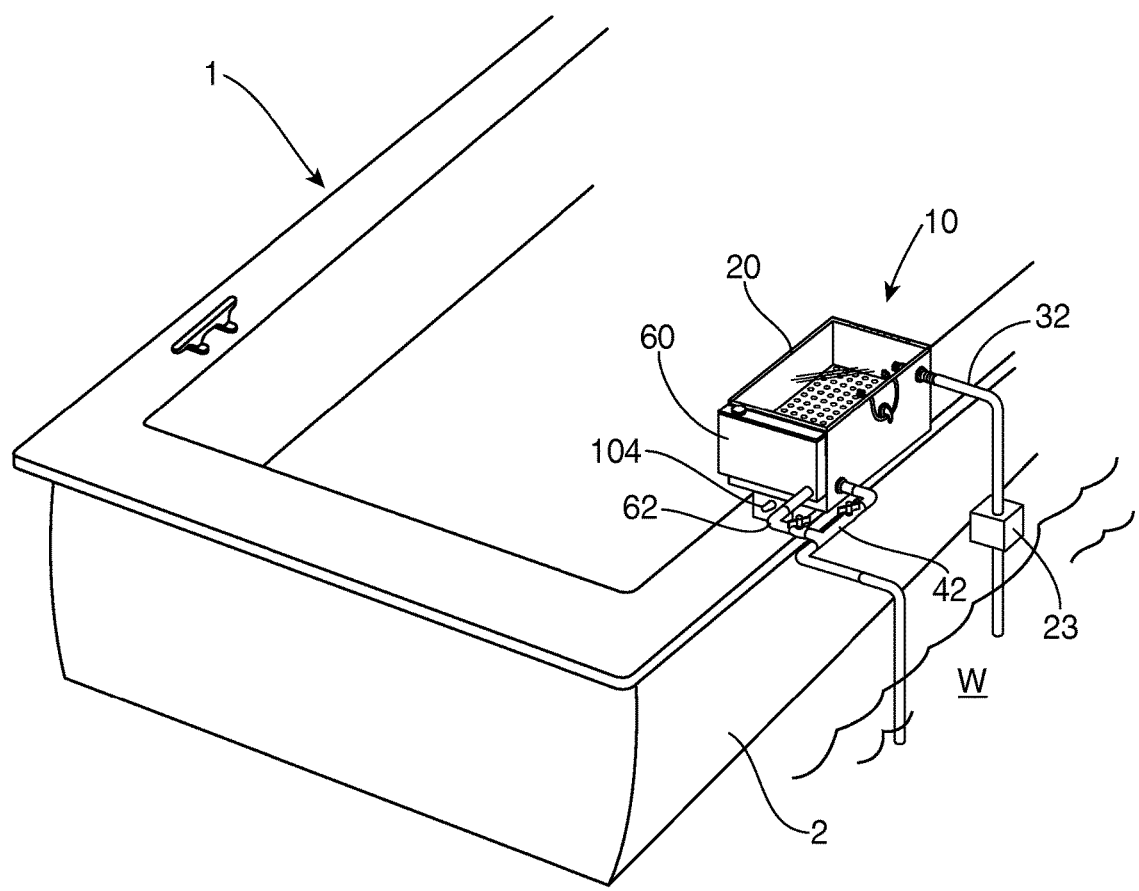
FIG. 4B is a perspective view of the chum dispenser attached to a boat cleat as disclosed in accordance with at least one embodiment of the present invention.
Figure 4C:
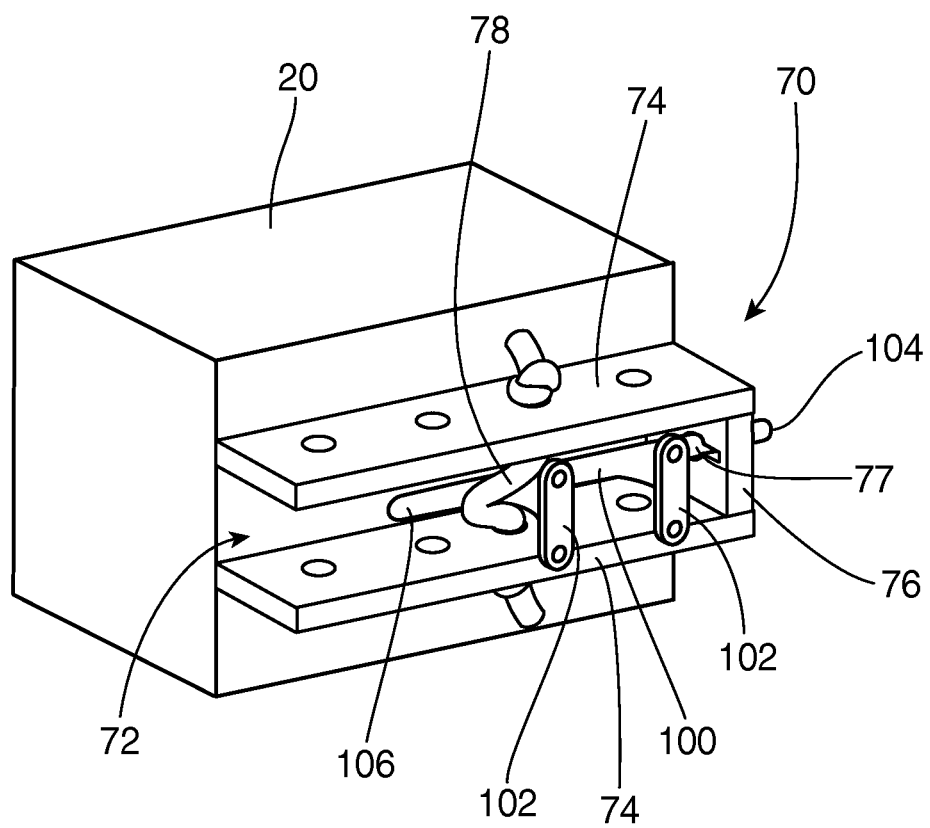
FIG. 4C is a bottom perspective view of the attachment assembly attached to a boat cleat as disclosed in accordance with at least one embodiment of the present invention.

Further structural features of certain embodiments may include an attachment assembly, generally referenced as 70, which is structured to removably attach the receptacle to a boat or other watercraft 1. For example, as shown in FIGS. 4A through 4C, at least one embodiment of the attachment assembly 70 may allow the chum dispenser 10 and/or the receptacle 20 thereof to be removably attached to a cleat 100. Specifically, the cleat 100 may include a base 102 that is secured to the boat or watercraft 1, for example, along the edge of the boat or watercraft 1 as shown in FIG. 5, for example. Oftentimes, the cleat 100 will have one or more arms, for example two arms 104, 106 that extend outward in opposite directions from the base 102. Accordingly, the cleat 100 is often used to tie, wrap or knot a rope to—allowing the other end of the rope to secure to a dock, anchor, an adjacent boat, or other like structure.

Referring to 4A through 4C, the attachment assembly 70 may extend from a bottom or base or the receptacle 20 for positioning at least partially over one or more cleats 100. Particularly, with reference to FIG. 4C, the attachment assembly 70 of at least one embodiment may include a channel 72 defined by longitudinal walls 74 and at least one end wall 76. At least one end wall 76 may include an opening or aperture 77 through which one of the arms 104 of the cleat 100 can pass. The opening 77 may be of virtually any shape and configuration, including, a keyhole type shape, as shown in the figures, a round, oval, square, or rectangular shape, etc., so long as the arm 104 of the cleat 100 may fit therein in the manner described and shown.

Still referring to FIG. 4C, wherein for clarity, the underside of the attachment assembly 70 and the cleat 100 are shown, the opposite arm 106 of the cleat 100 may be secured within the channel 72. For example, in one embodiment, a securing device 78 may span or extend across the channel 72 in a manner that is structured to securely engage or at least partially retain the arm 106 therein. Specifically, in one embodiment, the securing device 78 may include a flexible, resilient, and in some cases, stretchable, retention device such as a bungee cord, rope, rubber tube, etc. This allows the cleat 100, and in particular the arms 104, 106 thereof, to be retained within or by the attachment assembly 70, for example, via the opening 77 of end wall 76 and the securing device 78 extending across the channel 72.

Other attachment assemblies 70 structured to retain the chum dispenser 10 of the present invention to a boat cleat 100 or other like structure is contemplated within the full spirit and scope of the present invention.

In any event, with the chum dispenser 10 secured to the boat or watercraft 1, as shown in FIG. 4B, for example, the inlet line 32 may extend down into the surrounding water, wherein a water pump disposed along inlet line 32 is structured to draw water from the surrounding body of water and pump it into the receptacle 20, for instance, into the chum receiving section thereof. As described herein, other embodiments may contemplate attachment of the inlet line 32 to other water or fluid sources, including, for example, fresh water sources on the watercraft, or an existing water pump or water flow device on the watercraft 1.

Still referring to FIG. 4B, the outlet line 42 may be positioned over the edge of the watercraft 1 and into the surrounding body of water, allowing the fluid-chum mixture and/or fish oil or other fish attractants to flow there through and into the body of water, as described herein.

Figure 5A:
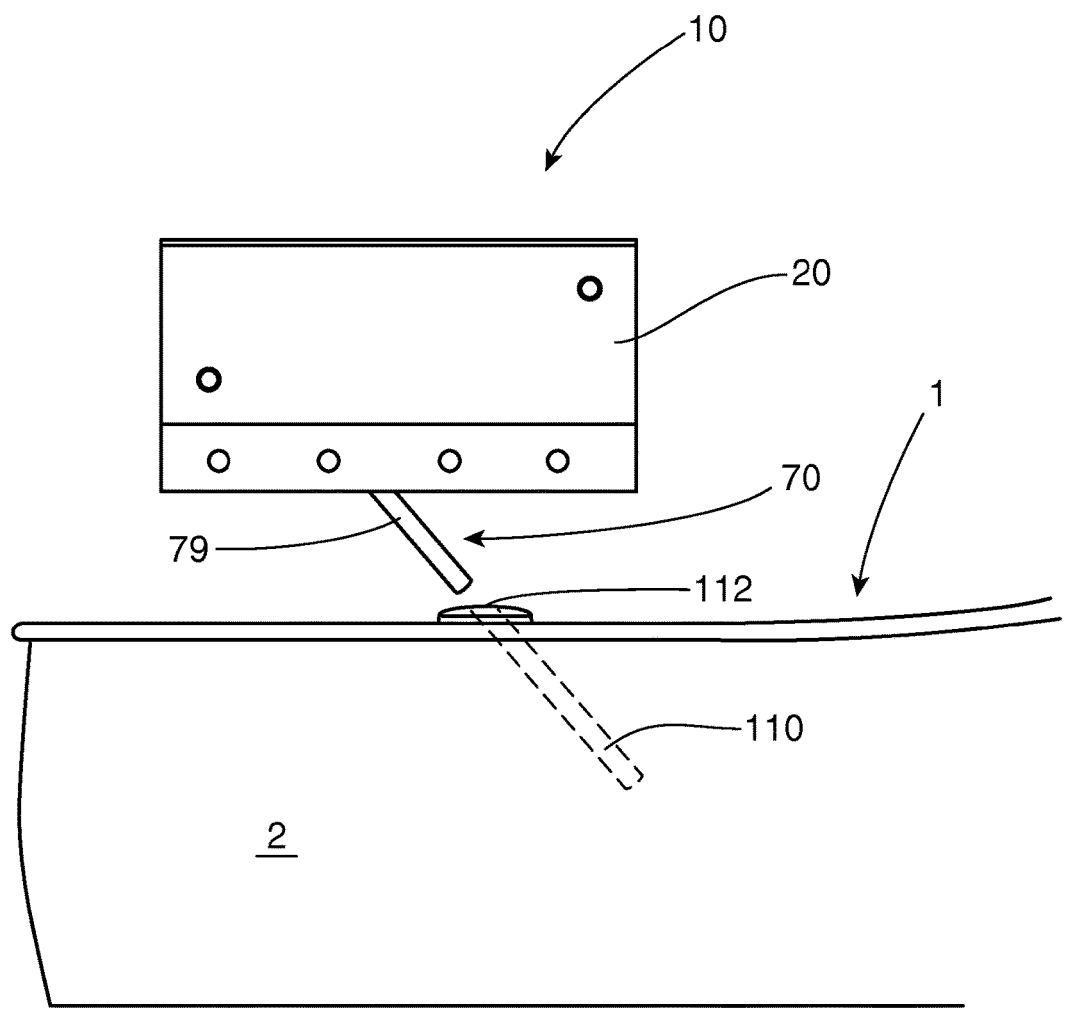
FIG. 5A is an exploded side view of yet another embodiment of the attachment assembly of the present invention.
Figure 5B:
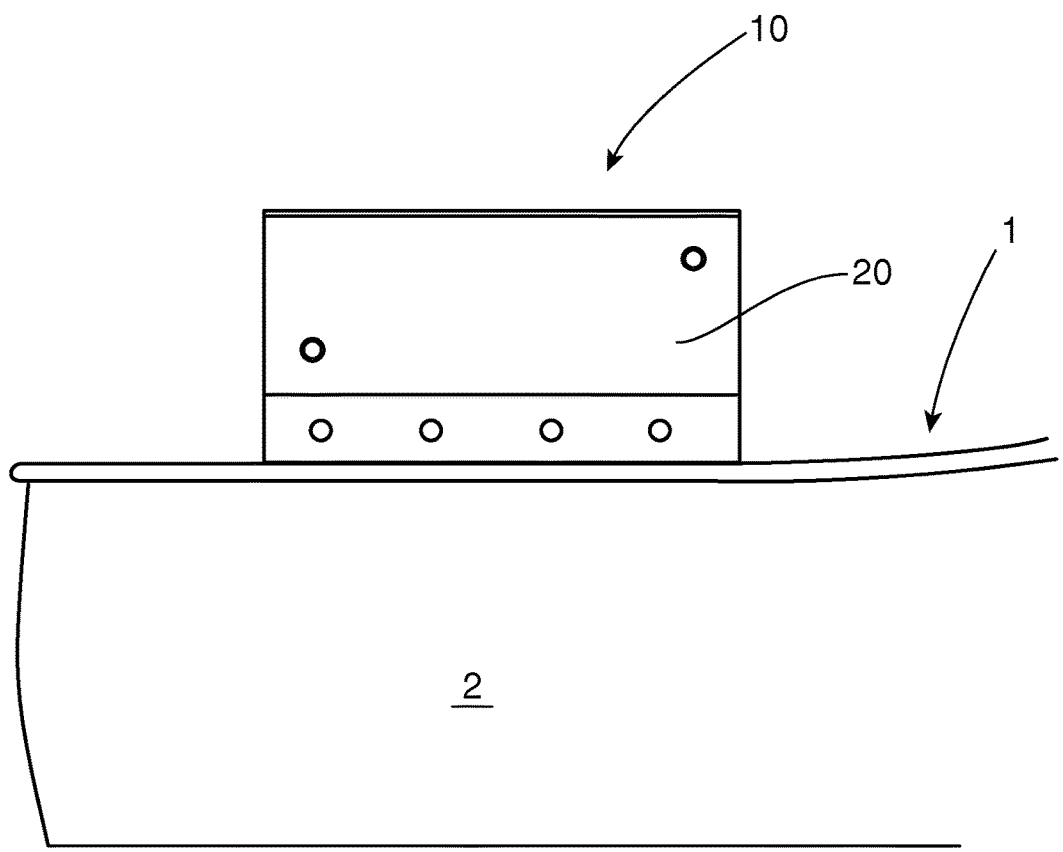
FIG. 5B is a side view of the chum dispenser attached to a rod retention channel as disclosed in accordance with at least one embodiment of the present invention.

Furthermore, with reference to FIGS. 5A and 5B, yet another attachment assembly 70 is disclosed in accordance with the present invention. Particularly, the attachment assembly 70 may include an attachment rod 79 that is specifically configured to telescopically or otherwise slide within an existing fishing rod retention channels 110. Particularly, many boats and watercraft 1, and in particular fishing boats, include one or more fish rod retention channels 110, for example, along an edge of the boat 1 or other locations. These channels are typically configured to retain a fish rod therein, such as the handle portion or end of the fish rod, while the remaining portion of the rod extends upwardly, typically at a slight angle. In this regard, the rod retention channel 110 may include an angled channel that extends into the hull of the boat or other location and terminates at an open top end through which a fishing rod or other similarly shaped device may fit.

Accordingly, in at least one embodiment, the attachment assembly 70 includes an attachment rod 79 extending downwardly from the base or bottom the receptacle 20. In some embodiments, the attachment rod 79 will extend downward at an angle, as shown in FIG. 5A, for example, to substantially match the angle of the rod retention channel 110. In this manner, the attachment assembly 70 may slide within the rod retention channel 110 of the watercraft, for example, through the open top end 112, allowing the receptacle 20 of the chum dispenser 10 to be level along the top edge of the boat 1. Although not shown in FIGS. 5A and 5B, the inlet line and outlet line(s) may be positioned down into the surrounding body of water, as described herein. Of course, the inlet line may also or instead be connected to other sources of water or fluid, as provided herein within the scope of the invention.

Figure 6:
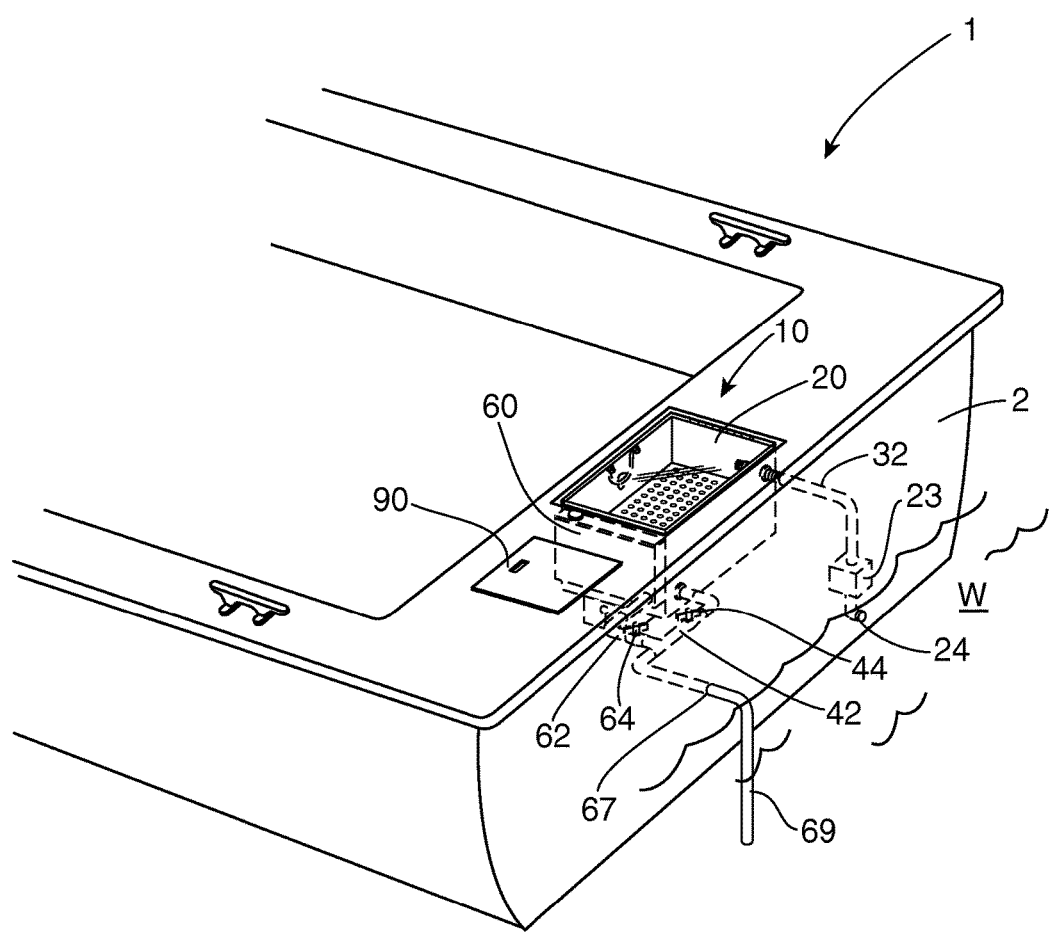
FIG. 6 is a top perspective view of yet another embodiment of the present invention where in the chum dispenser is at least partially integrally formed with or built into a portion of the watercraft or hull.

FIG. 6 represents yet another embodiment of the present invention. In particular, the chum dispenser 10, as provided herein, may be in combination with a watercraft 1 or boat hull 2, in that the chum dispenser 10, and in particular, the receptacle 20 thereof, may be integrally formed, built-in, or constructed with or as part of the watercraft 1, such as, for example, a part of the boat hull 2, transom, or other section or location of the watercraft 1. Specifically, the chum dispenser 10 may be integrated as part of the watercraft 1, which in FIG. 6 shows the chum dispenser 10 integrated at or near the rear of the watercraft 1 or transom, although virtually any location within the watercraft and/or boat hull may be contemplated. For example, in one embodiment, the lid 25 or cover may be opened to allow access into the receptacle 20 that is integrally formed with the boat or boat hull.

The integral chum dispenser 10, for example, as shown in FIG. 6, functions in a similar manner as the other embodiments of the chum dispenser 10 disclosed herein. For instance, as before, a block of frozen, fresh or other chum or fish components (whether frozen or not frozen) may be disposed within the receptacle. With the lid preferably closed, the inlet line 32 may be activated in order to allow a flow of water or other fluid into the receptacle 20. For example, activation of the inlet line 32 may be accomplished by turning on a water pump 23 or opening a valve (not shown).

Particularly, the inlet line 32 may be interconnected to a water pump 23 and may terminate at an opening 24 in the hull or other location of the boat. In operation, opening 24 may be submerged in the surrounding body of water, e.g., lake, ocean, etc., in a manner that allows the water pump 23 to draw water through the inlet line 32 and into the receptacle. The inlet line 32 and the water pump 23 may, in certain embodiments, be disposed within the hull of the watercraft 1 such that they are not substantially exposed. Control of the water pump 23 and/or a fluid control assembly (e.g., valve) (not shown) of the inlet line 32 may be accomplished electronically, automatically and/or manually. For example, the water pump and/or valve may be connected to a control panel (e.g., as part of the chum dispenser 10 or as part of the watercraft 1) which may be operated to control the functioning of the water pump and/or valve(s). Other embodiments may include a door, lid or other opening (not shown) in the boat or watercraft construction through which a user may reach and manually operate an inlet fluid control assembly, such as an inlet valve, on/off switch, etc.

Similarly, the outlet line 42, control assembly 44, and in some embodiments, the intermediate outlet line 62 and intermediate control assembly 64, may be substantially disposed within the hull 2, transom or other location of the watercraft 1. The outlet line(s) 42, 62 may terminate at an opening 67 in the hull or other portion of the boat, for example, to direct the output (e.g., fluid-chum mixture and/or oil) into the surrounding body of water. An extension line 69 may, in some cases, extend from the opening 67, for example, to more accurately control the direction or location of the output into the surrounding body of water. The extension line may be rigid or flexible and permanent, removable and/or positionable.

Furthermore, control of the fluid control assemblies 44, 64 of the outlet line 42 and/or intermediate outlet line 44 may be accomplished electronically, automatically and/or manually. For example, the fluid control assemblies 44, 64 may be connected to a control panel (e.g., as part of the chum dispenser 10 or as part of the watercraft 1) which may be operated to control the functioning of the fluid control assemblies 44, 64. Other embodiments may include manual operation of the valves wherein access to the valve(s) is provided. For example, with reference to FIG. 6, in one exemplary embodiment, an access door, opening, panel or other lid 90 may be included in or on the watercraft 1 which can provide manual access to the valve(s) or other fluid control assemblies 44, 64. Particularly, in one embodiment, a user may open a lid 90 and reach into the watercraft 1 where manual access to the valves or fluid control assemblies 44, 64 may be provided. Of course, other access, whether manual or electronic, to the valves, fluid control assemblies 44, 64 on/off switches, etc. may be contemplated within the full spirit and scope of the present invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A chum dispenser, comprising:
    at least one receptacle comprising an at least partially open interior portion, said interior portion comprising at least two sections separated by a porous divider, wherein said at least two sections of said interior portion comprise a chum receiving section and a chum dispensing section,
    an inlet line disposed in a fluidically communicative relation with the chum receiving section of said interior portion, said inlet line being structured to provide a flow of fluid into said chum receiving section of said interior portion of said at least one receptacle,
    an outlet line disposed in a fluidically communicative relation with said chum dispensing section of said interior portion to provide a flow of a fluid-chum mixture from said chum dispensing section, and
    an attachment assembly attached to a bottom of said receptacle, said attachment assembly comprising a channel defined by at least two longitudinal walls and an end wall, wherein said end wall is intersected by a longitudinal axis of the channel.

2. The chum dispenser as recited in claim 1 wherein said attachment assembly further comprises a securing device spanning said channel between said at least two longitudinal walls.

3. The chum dispenser as recited in claim 2 wherein said securing device comprises a flexible cord.

4. The chum dispenser as recited in claim 1 wherein said end wall of said attachment assembly comprises an aperture.

5. A chum dispenser, comprising:
    at least one receptacle comprising an at least partially open interior portion, said interior portion comprising at least two sections at least partially separated by an at least partially porous divider, wherein said at least two sections of said interior portion comprise a chum receiving section and a chum dispensing section,
    an inlet line disposed in a fluidically communicative relation with the chum receiving section of said interior portion and a fluid source, said inlet line being structured to provide a flow of fluid into said chum receiving section of said interior portion of said at least one receptacle,
    an outlet line disposed in a fluidically communicative relation with said chum dispensing section of said interior portion to provide a flow of a fluid-chum mixture from said chum dispensing section,
    a fluid control assembly interconnected to said outlet line, said fluid control assembly being structured to provide a selective control of the fluid-chum mixture from said chum dispensing section, and
    an attachment assembly attached to said receptacle, said attachment assembly comprising a channel defined by at least two longitudinal walls and an end wall, said end wall comprising an aperture disposed there through, said attachment assembly further comprising a securing device spanning said channel between said at least two longitudinal walls.

6. The chum dispenser as recited in claim 5 wherein said chum receiving section is disposed above said chum dispensing section, said chum receiving section being sized to receive at least one frozen block of chum.

7. The chum dispenser as recited in claim 6 wherein said at least partially porous divider comprises a substantially planar panel comprising a plurality of holes disposed there through for providing a flow of said fluid-chum mixture from said chum receiving section and into said chum dispensing section.

8. The chum dispenser as recited in claim 7 wherein said at least partially porous divider is removably disposed within said at least one receptacle.

9. The chum dispenser as recited in claim 8 wherein said at least one receptacle comprises at least one interior support ledge, and wherein said at least partially porous divider is removably disposed on said at least one interior support ledge to define and at least partially separate said chum receiving section and said chum dispensing section.

10. The chum dispenser as recited in claim 9 further comprising a lid disposable between an open position and a closed position; said chum receiving section being accessible from a position external to said at least one receptacle when said lid is disposed in said open position.

11. The chum dispenser as recited in claim 10 wherein at least a portion of said lid is at least partially transparent.

12. The chum dispenser as recited in claim 5 further comprising a secondary receptacle comprising an opening and an intermediate outlet line.

13. The chum dispenser as recited in claim 12 wherein said intermediate outlet line being interconnected to said outlet line from said chum dispensing section.

14. The chum dispenser as recited in claim 13 wherein said secondary receptacle comprises an oil receptacle comprising an interior portion isolated from said at least partially open interior portion of said at least one receptacle.

15. The chum dispenser as recited in claim 14 further comprising a secondary fluid control assembly interconnected to said intermediate outlet line to provide a selective flow of oil from said oil receptacle.

* * * * *